US012590655B2

(12) United States Patent
Figaro

(10) Patent No.: US 12,590,655 B2
(45) Date of Patent: Mar. 31, 2026

(54) INTERLOCKING SECTIONAL TUBING

(71) Applicant: Michael Edward Figaro, Golden, CO (US)

(72) Inventor: Michael Edward Figaro, Golden, CO (US)

( * ) Notice: Subject to any disclaimer, the term of this patent is extended or adjusted under 35 U.S.C. 154(b) by 454 days.

(21) Appl. No.: 18/222,934

(22) Filed: Jul. 17, 2023

(65) Prior Publication Data

US 2024/0019052 A1     Jan. 18, 2024

Related U.S. Application Data

(60) Provisional application No. 63/389,415, filed on Jul. 15, 2022.

(51) Int. Cl.
    *F16L 13/02*      (2006.01)
    *F16L 9/02*       (2006.01)
    *F16L 43/00*      (2006.01)

(52) U.S. Cl.
    CPC ................. *F16L 13/02* (2013.01); *F16L 9/02* (2013.01); *F16L 43/001* (2013.01)

(58) Field of Classification Search
    CPC ..... F16L 9/02; F16L 9/22; F16L 13/02; F16L 43/001; B21C 37/08
    See application file for complete search history.

(56) References Cited

U.S. PATENT DOCUMENTS

| | | | |
|---|---|---|---|
| 7,360,799 B1 * | 4/2008 | Price | F16L 59/22 |
| | | | 285/47 |
| 10,550,964 B2 * | 2/2020 | James | F01N 13/00 |

| | | | |
|---|---|---|---|
| 11,946,403 B2 * | 4/2024 | Higgs, Jr. | F01N 13/10 |
| 2009/0293979 A1 * | 12/2009 | Scott | F16L 55/1657 |
| | | | 138/155 |
| 2018/0147714 A1 * | 5/2018 | Huskins | B25G 1/06 |
| 2018/0301472 A1 | 10/2018 | Matsukizono | |
| 2018/0313472 A1 * | 11/2018 | James | F01N 13/1816 |
| 2023/0417169 A1 * | 12/2023 | Higgs, Jr. | F01N 13/1805 |

FOREIGN PATENT DOCUMENTS

DE      202022105138 U1 *  10/2022  ............ F16L 43/001

OTHER PUBLICATIONS

Customizable Pie Cuts NPL (Year: 2022), Video found at https://www.tiktok.com/@germanweldingtools/video/7118708733982559493, published Jul. 10, 2022.*
German Welding Tools NPL (Year: 2022), Website found at https://www.german-weldingtools.com/zapfensegment-d603x15-norm-2-radius-r51-winkelsegment-125-grad-va/.*

* cited by examiner

*Primary Examiner* — Nicholas L Foster
(74) *Attorney, Agent, or Firm* — Kenneth Altshuler

(57) ABSTRACT

A tube arrangement as described herein can include a first and a second wedge shaped circular tube, or pie cut, that are each defined by a front face and a back face, a minimum face-to-face distance between the front face and the back face that is smaller than a maximum face-to-face distance between the front face and the back face. A plurality of evenly spaced keys is dispersed along the front face of the first pie cut. The keys are engaged with a plurality of evenly spaced facets dispersed along the back face of the second pie cut. A weld seals a joint located between the front face of the first pie cut to the back face of the second pie cut. This arrangement is beneficial for constructing custom shaped exhaust tubes by welding the offset pie cuts as needed.

18 Claims, 14 Drawing Sheets

134

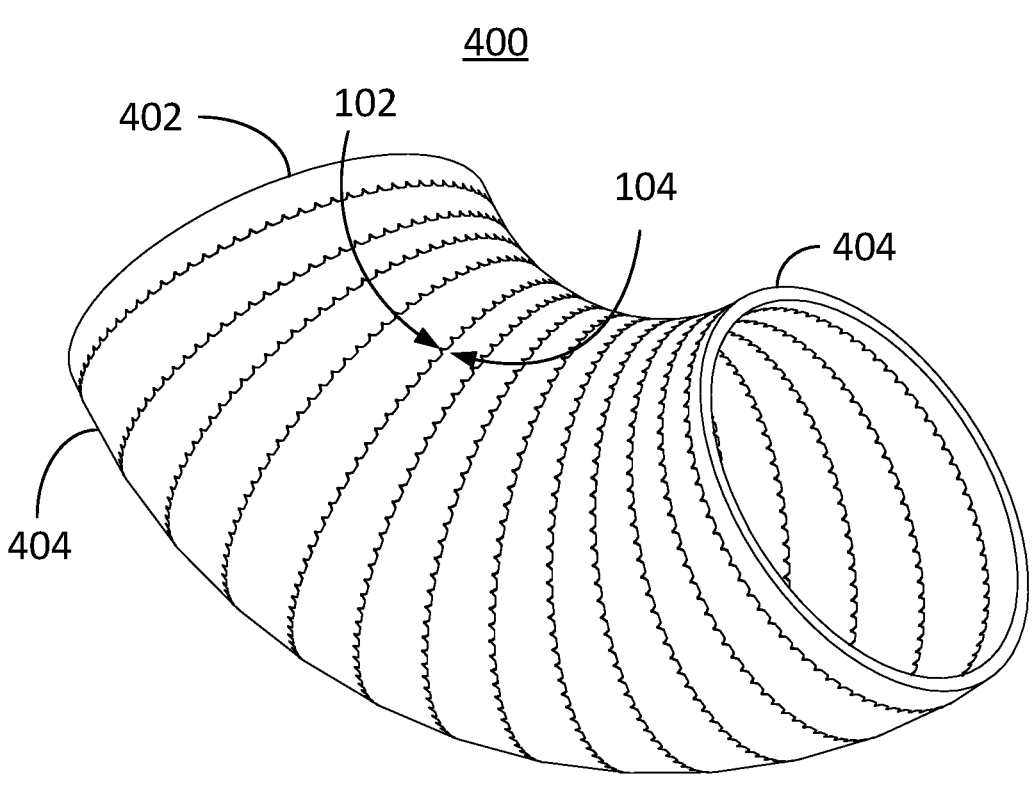
FIG. 9A
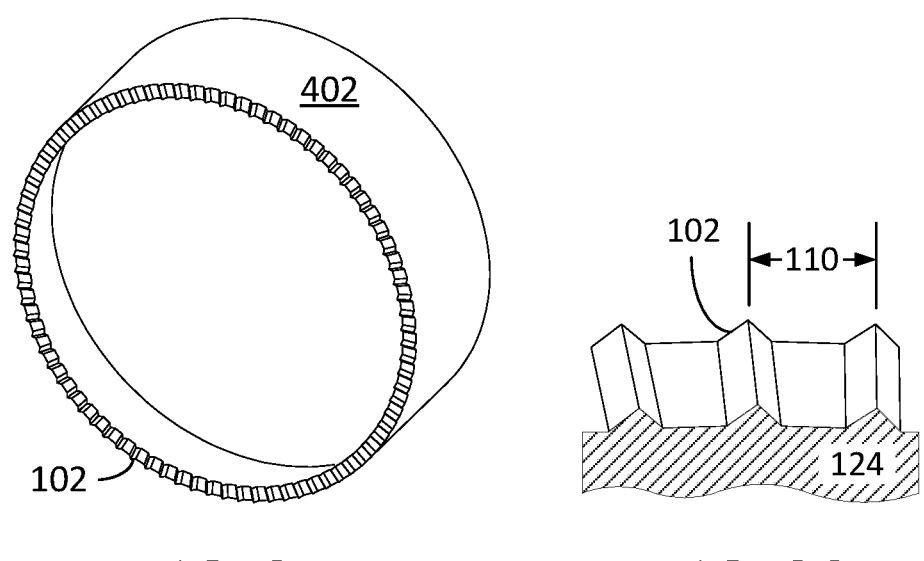
FIG. 9B          FIG. 9C

INTERLOCKING SECTIONAL TUBING

CROSS-REFERENCE TO RELATED APPLICATIONS

This application is a Non-Provisional patent application of U.S. Provisional Patent Application Ser. No. 63/389,415 entitled DESIGN, METHOD AND UTILITY OF A KEYED INTERLOCKING SECTIONAL TUBING CUT FOR FABRICATION OF BENDS filed on Jul. 15, 2022, the entire disclosure of which is hereby incorporated by reference.

BACKGROUND OF THE INVENTION

1. Field of the Invention

The present invention generally relates to processing and fabricating tubing with elbow profiles with tight-radius bends that can be used for air intake and exhaust systems.

2. Description of Related Art

The current methods of tube fabrication offer several types of smooth tubular elbow profiles from those bent with a crush punch and die, to those bend with a mandrel which travels inside that tubing to create a smooth bend. These smooth ends typically have a minimum centerline radius (CLR) based on the constraints of the material to be bent as well as the die and mandrel used to form the bend. When a suitable bend cannot be made with such methods, a group of angular cut sections of tube are cut via angled cuts from a straight tube and joined in succession to form a sectional bend elbow. These sections are often referred to a "pie-cuts" given their wedge shape similar to a slice of pie (wedge). Pie cuts can have various included angles dictated by the angle of approach on cutting device, but the addition of these included angles net the total bend angle desired. While the cutting can be done on any number or machines (saws, punches, lasers, or wire EDM), the results are similar in that the connecting pie shaped interfaces. The pie cuts are commonly joined by a method of welding, brazing or soldering to net the desired elbow.

As the pie-cuts are laid out and joined one-by-one, they are aligned visually and rotated about their smooth contact faces to form either straight bends with a semi-fixed plane or a freeform shape to allow multiple axis paths in more complicated systems. In either method, pie-cut sections are aligned only visually and along smooth surfaces. Another problem is that the base stock pie cuts are typically not perfectly round from sections of stock to stock, which can also create a tolerance issue resulting in gaps that need to be bridged, particularly more as the profiles are rotated. Because external jigs and fixtures are inconvenient to use, pie-cut sections are typically made via visual cues adding to the problem of repeatability.

It is to innovations related to improving repeatability of manufacturing tubular members from pie cuts that the subject matter disclosed herein is generally directed.

SUMMARY OF THE INVENTION

The present invention generally relates to processing and fabricating tubing with elbow profiles with tight-radius bends that can be used for air intake and exhaust systems.

In that light, certain embodiments contemplate a tube arrangement, which can comprise a first and a second wedge shaped circular tube (pie cut) and each defined by a front face and a back face, a minimum face-to-face distance between the front face and the back face that is smaller than a maximum face-to-face distance between the front face and the back face. A plurality of evenly spaced keys is dispersed along the front face of the first pie cut. The keys are engaged with a plurality of evenly spaced facets dispersed along the back face of the second pie cut. A weld seals a joint located between the front face of the first pie cut to the back face of the second pie cut.

Another embodiment of the present invention envisions an interlocked tube comprising a first pie cut tube section that is defined by a substantially circular first front face and a substantially circular first back face. The first pie cut tube section has a first minimum face-to-face distance between the first front face and the first back face, wherein the first minimum face-to-face distance is smaller than a first maximum face-to-face distance between the first front face and the first back face. The first pie cut tube section also has a plurality of evenly spaced keys that are dispersed along the first front face of the first pie cut tube section. The interlocked tube further comprising a second pie cut tube section that is defined by a substantially circular second front face and a substantially circular second back face. The second pie cut tube section having a second minimum face-to-face distance that is between the second front face and the second back face. The second minimum face-to-face distance is smaller than a second maximum face-to-face distance between the second front face and the second back face. The second pie cut tube section also having a plurality of evenly spaced facets that are dispersed along the second back face of the second pie cut tube section. The interlocked tube has a weld that seals a joint between the first front face and the second back face. There is at least one tack under the weld, wherein the tack connects one of the plurality of facets to one of the plurality of keys.

Still another embodiment of the present invention envisions a method to connect a first pie cut tube section to a second pie cut tube section. The method can comprise several steps including orienting a first pie cut front face of the first pie cut tube section with a second pie cut back face with the second pie cut tube section. This can be followed by meshing a plurality of keys that are equally spaced on the first pie cut front face with a plurality of facets that are equally spaced on the second pie cut back face. This step can then be followed by tacking at least one of the plurality of keys to a corresponding one of the plurality of facets. Next, a contiguous seam can be welded along the first pie cut front face and the second pie cut back face. The first pie cut tube section is defined by a minimum face-to-face distance between the first front face and a first back face of the first pie cut tube section. The minimum face-to-face distance is smaller than a maximum face-to-face distance between the first front face and the first back face.

BRIEF DESCRIPTION OF THE DRAWINGS

FIGS. 9A-9C are line drawings illustratively depicting yet a different embodiment of the present invention with the angular separation between the facets and keys closer together than in the embodiments of FIG. 1.

DETAILED DESCRIPTION

Figure 1:
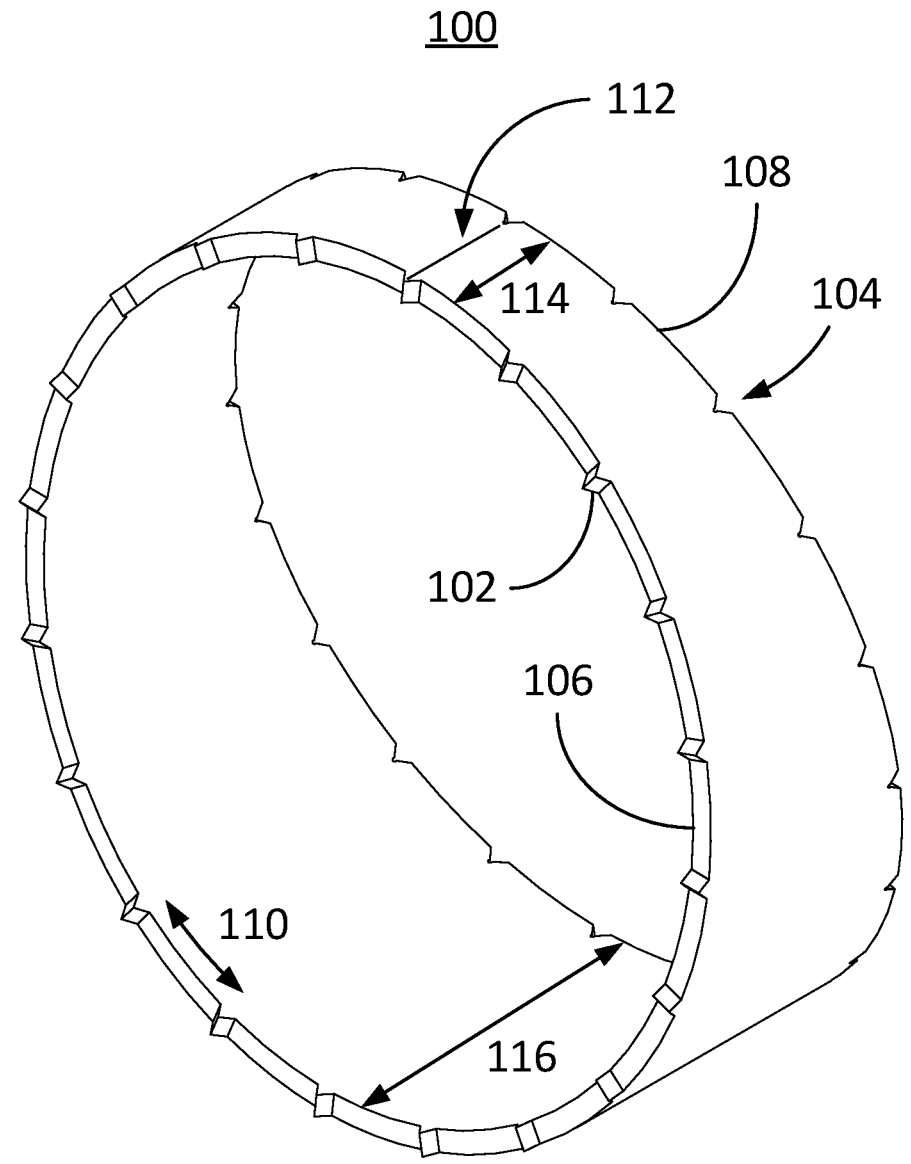
FIG. 1 is a line drawing of an isometric view of a single angular tube segment shows in accordance with an embodiment of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are method and apparatus embodiments of keyed and faceted profile features evenly dispersed along the interface of angular cut tubular profiles referred to herein as pie cuts. The keyed and faceted profile features include interlocking elements that are configured to cooperate with one another in a male and female relationship. The application of the keyed and faceted features ensures fabrication repeatability in tubular elbows and complex multi-axis sectional structures that are configured and arranged to pass fluid or exhaust from automobiles therethrough. In addition, aspects of the present invention envision providing a reference system with the keyed and faceted profile features to assist in ease of repeatability during methods of joining the pie cuts, such as via welding. This arrangement is beneficial for constructing custom shaped exhaust tubes by welding the offset pie cuts as needed.

FIG. 1 is a line drawing of an isometric perspective of a single angular tube segment consistent with embodiments of the present invention. As shown here, the single angular tube segment 100 (also referred to herein as a "pie cut") generally comprises a plurality of protruding keys, or simply "keys" 102, that are evenly dispersed along the circular profile of the front face 106 and a plurality of facets 104 that are likewise evenly dispersed along the circular profile of the back face 108. In this embodiment, the facets are triangular shaped facets that conform to triangular shaped keys, however other embodiments envision different shaped keys and facets, such as rounded shaped keys, rectangular shaped keys, etc. Each of the keys 102 are separated by an angular separation 110 that is defined by 360°/N, where N is the number of keys 102 on the front face 106. Likewise, each of the facets 104 are separated by the same angular separation 110, wherein the number of facets 104 are equal to the number of keys 102. The keys 102 and facets 104 can be formed by laser cutting the edges of the pie cut 100 (where the faces 106 and 108 are located). In this embodiment, the exemplified pie cut 100 comprises a minimum wedge distance reference line 112 (or zero-position reference line) that indicates where the minimum distance 114 is between the front face 106 and the back face 108. The maximum distance 116 from the front face 106 to the back face 108 is on the opposite side of the cylindrically shaped pie cut 100 from the minimum distance 114, and in some embodiments also comprises a maximum wedge distance reference line 118 (shown in FIG. 5B).

Figure 2:
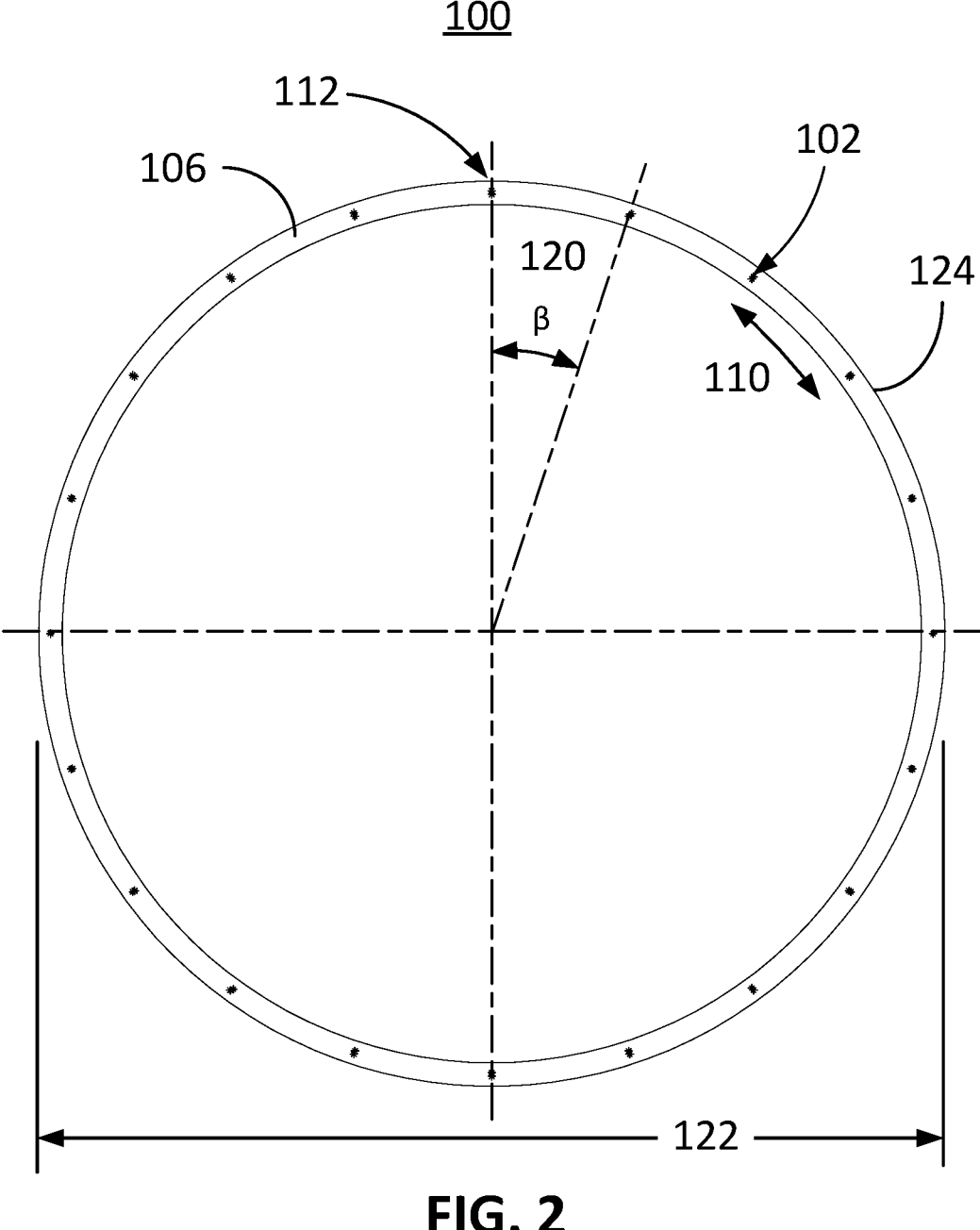
FIG. 2 is a line drawing showing the front face 106 of the pie cut 100 of FIG. 1 facing out of the page.

FIG. 2 is a line drawing showing the front face 106 of the pie cut 100 of FIG. 1 facing out of the page. The 20 points dispersed along the substantially circular profile of the front face 106 correspond to where the keys 102 are located. The term "substantially" as used herein has the same definition as the term "essentially" previously defined. The keys 102 are 18° apart, represented by the angle β 120. Accordingly, if the outer diameter 122 of the pie cut 100 is 3 inches, then the angular separation 110 along the outer surface 124 of the pie cut 100 is about 0.47 inches long.

Figure 3A:
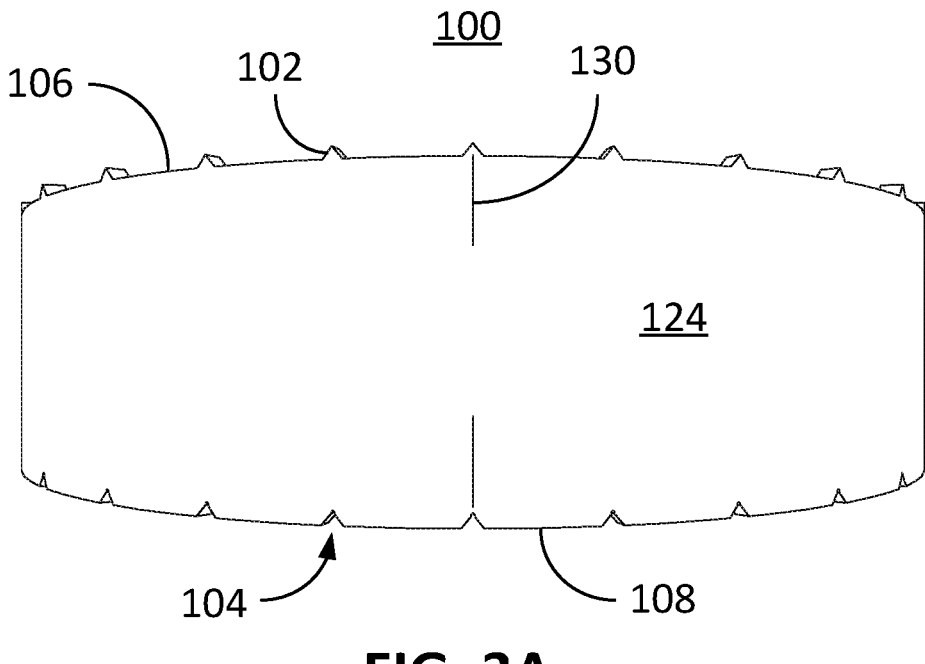
FIGS. 3A and 3B are line drawing views of the pie cut 100 consistent with embodiments of the present invention.
Figure 3B:
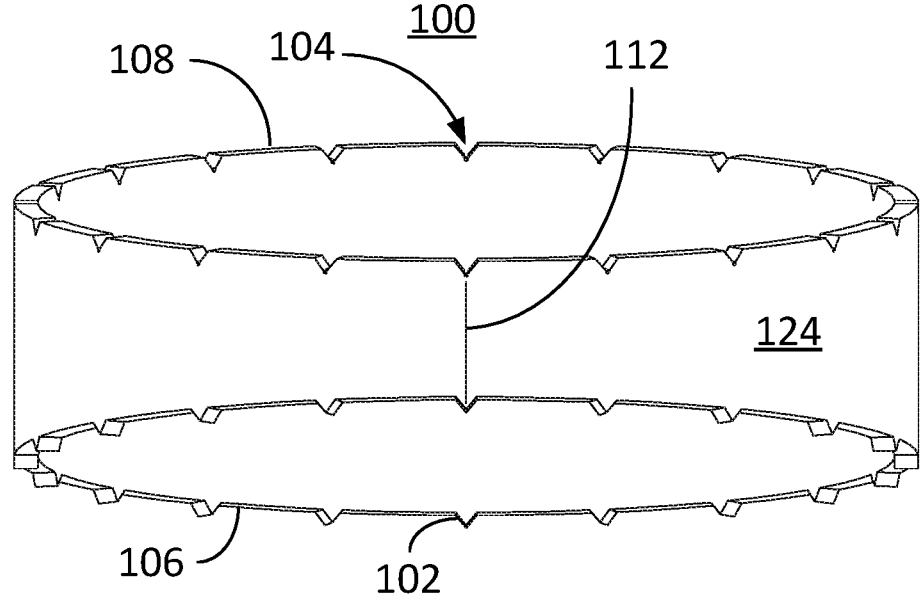

FIGS. 3A and 3B are line drawing views of the pie cut 100 consistent with embodiments of the present invention. FIG. 3A depicts the pie cut 100 with the minimum distance 114 between the front face 106 and the back face 108, which is pointing out of the page to provide a better perspective on the keys 102 and facets 104. As shown here, the minimum wedge distance reference line 112 is shown on the outer surface 124 of the pie cut 100. FIG. 3B depicts the pie cut 100 with the maximum distance 116 between the front face 106 and the back face 108 pointing out of the page. As shown in this figure, the 180° position reference line 130 is shown on the outer surface 124 at the maximum distance 116. Other reference lines can be placed along the outer surface (such as in the midplane that is between the maximum distance 116 and the minimum distance 114) and in some instances, indicia, such as numbers, letter, angles, etc., can be printed at the reference lines or instead of the reference lines.

Figure 4:
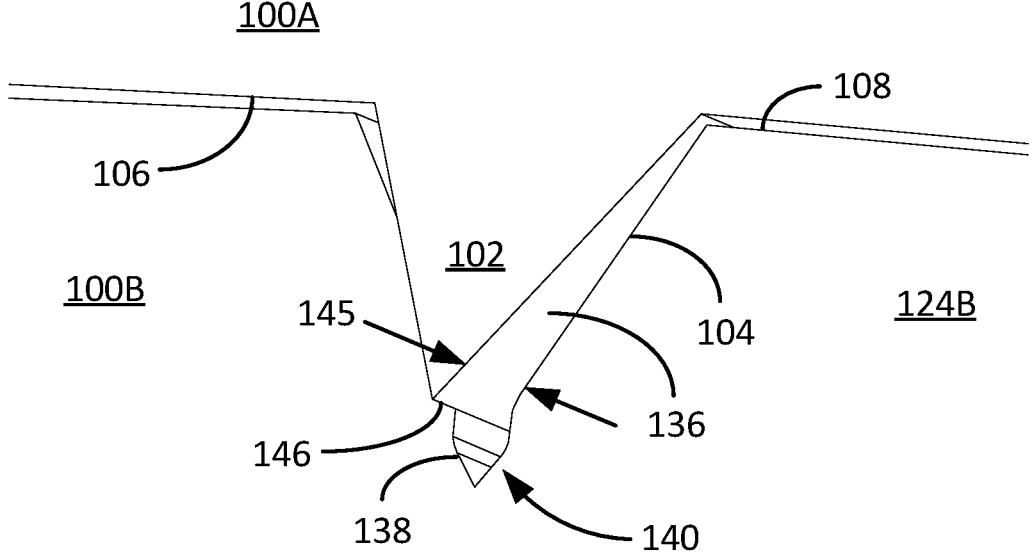
FIG. 4 is a line drawing that illustratively depicts two pie cuts joined via a triangular key embodiment that is cooperating with a conforming facet embodiment.

FIG. 4 is a line drawing that illustratively depicts two pie cuts joined via a triangular key embodiment in cooperation with a conforming facet embodiment. As shown, a key 102 from a first pie cut 100A is matingly engaged with a facet 104 from a second pie cut 100B, which means that a front face 106 of the first pie cut 100A is arranged in close proximity or otherwise essential in contact with a back face 108 of the second pie cut 100B. By close proximity it is envisioned that the spacing between the two faces 106 and 108 are less than 2 mm and preferably less than 0.5 mm, though it should be understood that other separation distances and tolerances may be more than 2 mm depending on the size of the pie cuts or other factors or configurations of keys and facets. Certain embodiments of the present invention envision providing sufficient play in the different parts of the pie cuts to mesh for improved manufacturing due more easily to the natural tolerance differences between pie cuts, interfacing faces, keys and facets. In this embodiment, the second pie cut 100B comprises a key 102 that stands proud 145 relative to the outer surface 124B. The proud portion (proud material) 136 is envisioned to provide extra material that can melt into a facet detolerance window 138 located at the apex 140 of the facet 104. The detolerance window 138 is envisioned to help tack/weld the first pie cut 100A to the second pie cut 100B. The facet window 138 also provides some leeway for the key tip 146 of the key 102 to fully engage the facet 102.

Figure 5A:
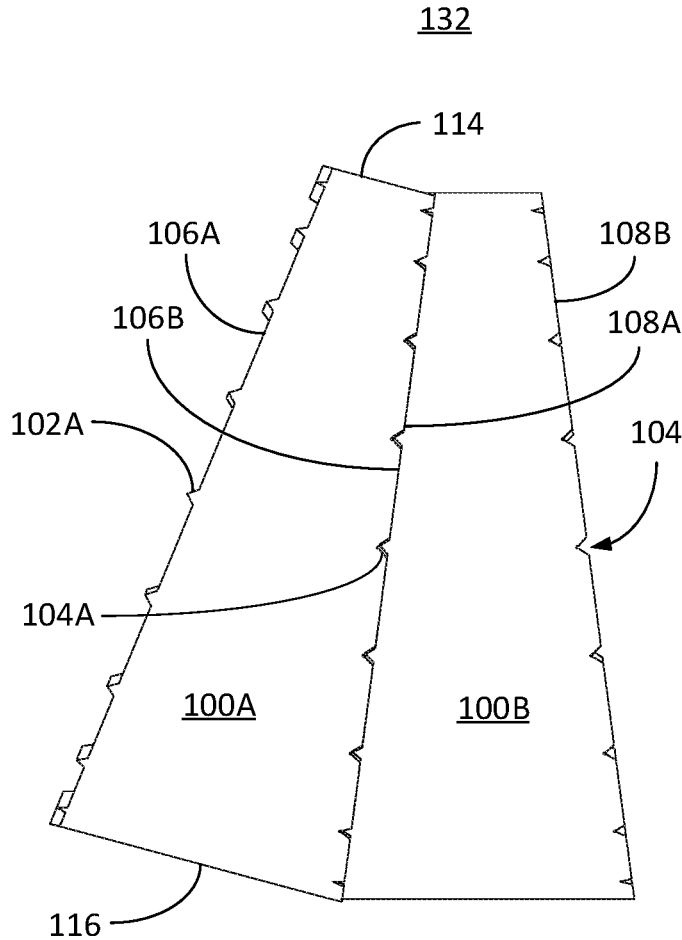
FIGS. 5A-5D are line drawings of two pie cuts connected consistent with embodiments of the present invention.
Figure 5B:
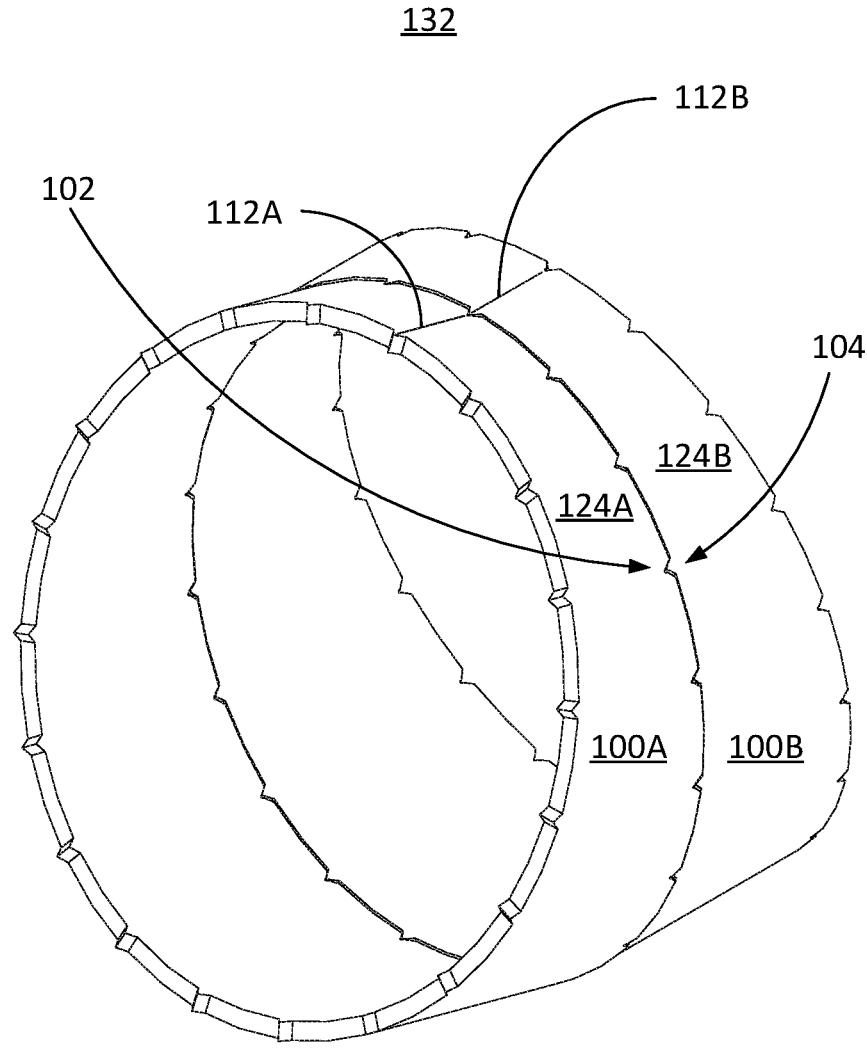

FIGS. 5A-5D are line drawings of two pie cuts connected consistent with embodiments of the present invention. As shown in FIG. 5A, a first pie cut 100A is connected to a second pie cut 100B by way of interconnecting keys 102 and facets 104. More specifically, the first front face 106A is not connected to any other pie cut but is arranged with a plurality of first pie cut keys 102A in anticipation of connecting to another pie cut, unlike an end cap pie cut 204 of FIG. 6A. The first back face 108A is connected to the second front face 106B via the first pie cut facets 104A engaged with the second pie cut keys 102B. The second back face 108B comprises a plurality of second pie cut facets 104B that are available to engage a third pie cut (not shown). In this arrangement, the respective minimum distance portions 114 of each pie cut 100A and 100B are joined together to form a larger wedge shaped tubular element 132 that is arranged in a maximum arc. FIG. 5B is an isometric drawing showing the first pie cut 100A connected to the second pie cut 100B via the interconnected keys 102 and facets 104 with the minimum wedge distance reference lines 112 aligned. As shown a first reference line 112A is visibly located on the first outer surface 124A of the first pie cut 100A and a second reference line 112B is visibly located on a second outer surface 124B of the second pie cut 100B.

Figure 5C:
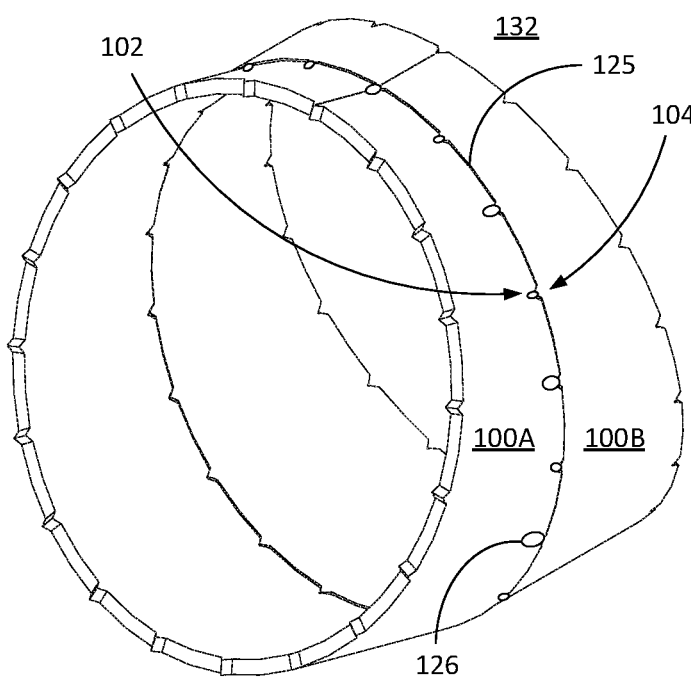
Figure 5D:
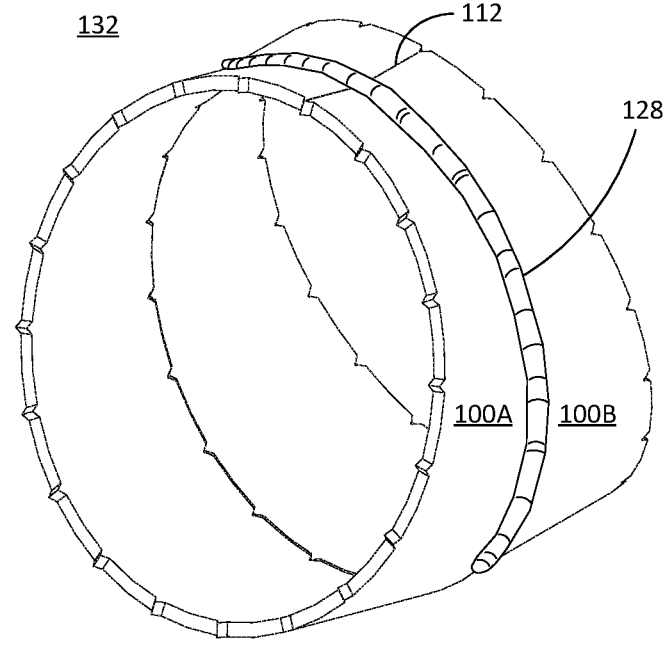

FIG. 5C is a line drawing depicting an embodiment that envisions tacks 126 dispersed along the interface 125 between the first pie cut 100A and the second pie cut 100B. More specifically, when the first and second pie cuts 100A and 100B are placed together, with the keys 102 in the facets 104 engaged along the interface 125, the proud portion 136 at the key tips 146 from the second pie cut 100B are melted at the facets 104 at the first pie cut 100A thereby tacking or otherwise securing the first and second pie cuts 100A and 100B at the interface 125. The material at the tacks 126 can melt into the detolerance windows 138 (of FIG. 4) further improving the strength of the tacks 126. Once the pie cuts 100A and 100B are secured in place, the interface joint 125 is welded via a weld joint 128 to seal the interface 125, as depicted in FIG. 5D.

Figure 6A:
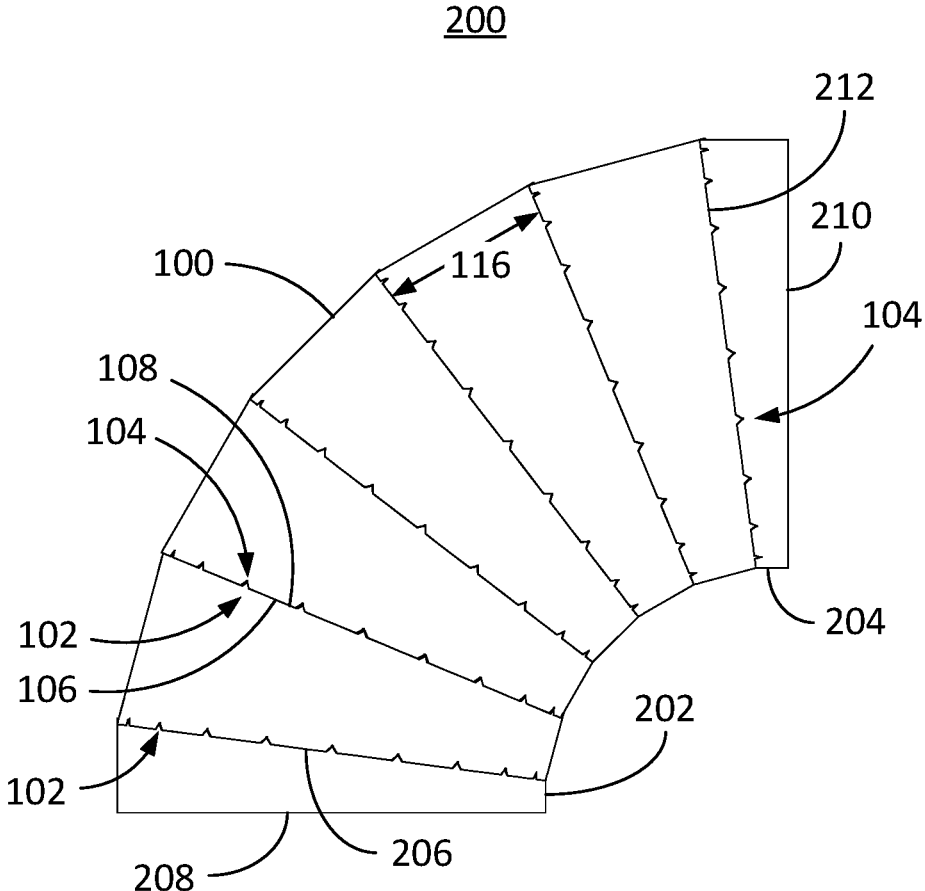
FIGS. 6A-6C are line drawings of different views of tubular elbow constructed from a plurality of pie cuts consistent with embodiments of the present invention.
Figure 6B:
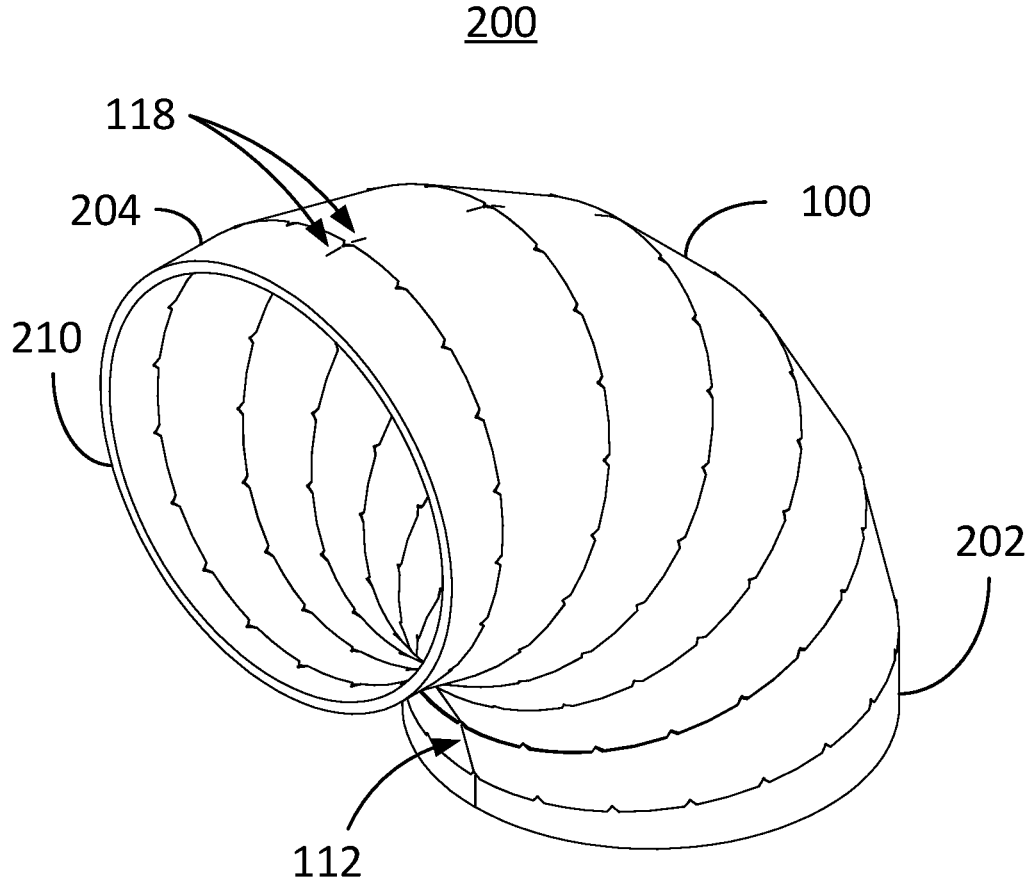
Figure 6C:
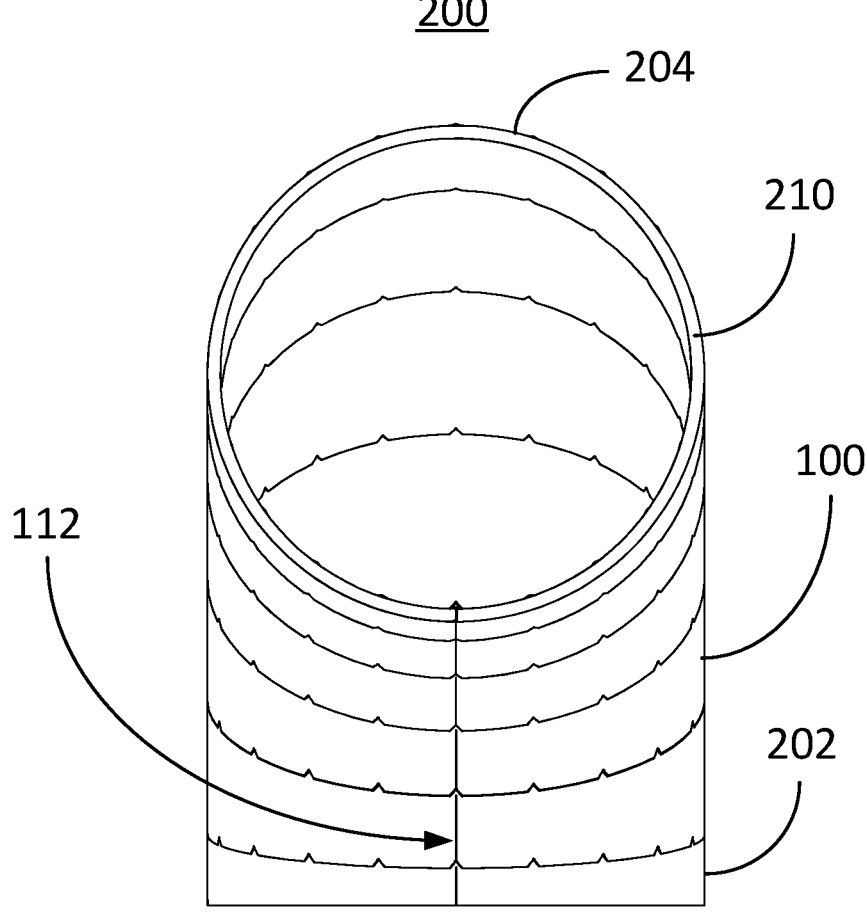

FIGS. 6A-6C are line drawings of different views of tubular elbow constructed from a plurality of pie cuts consistent with embodiments of the present invention. FIG. 6A is a side view of an elbow 202 constructed with seven pie cuts, wherein the elbow 202 comprises five inner pie cuts 100 that are disposed between pie cut caps 202 and 204. The inner pie cuts 100 each comprise a front face 106 with keys 102 and in the back face 108 with facets 104. In contrast, the first pie cut cap 202 comprises only keys 102 that are located on the front face 206 of the first pie cut cap 202. The back face 208 of the first pie cut cap 202 is smooth. The second pie cut cap 204 comprises only facets 104 that are located on the back face 212 of the second pie cut cap 204. It is important to recognize that the back face 212 of the second pie cut cap 204 is elliptical compared to the front face 210 of the second pie cut cap 204 simply based on the geometry of the angle from the front face 210. In other words, the elliptical profile of the second pie cut cap back face 212 is proportional to the size of the angle from the second pie cut cap 204 of the front face 210. Hence, the greater the angle that the second pie cut cap back face 212 is from the front face 210, the more elliptical that second pie cut cap back face 212 is. The front face 210 of the second pie cut cap 204 is smooth but more importantly it is a substantially circular face that facilitates a close tolerance fitting with a substantially circular connection tube (not shown). The elbow 200 is constructed with all the pie cuts 100, 202 and 204 arranged with their maximum pie cut wedge distance 116 aligned, as shown.

FIG. 6B is an isometric view of the elbow 200 of FIG. 6A. As shown from this perspective, maximum wedge distance reference lines 118 and the minimum wedge distance reference lines 112 are aligned with the keys 102 and the facets 104 interconnected. Each of the pie cuts 100, 202 and 204 are tacked together and then welded in place. Also shown is the second pie cut cap front face 210 as well as the tubular pathway one from the connected pie cuts 100, 202 and 204.

FIG. 6C is a front view of the elbow 200 FIG. 6A depicting the second pie cut cap front face 210 of the second pie cut cap 204 in plane with the page and five inner pie cuts 100 disposed between pie cut caps 202 and 204. Also shown are the aligned minimum wedge distance reference lines 112.

Figure 7A:
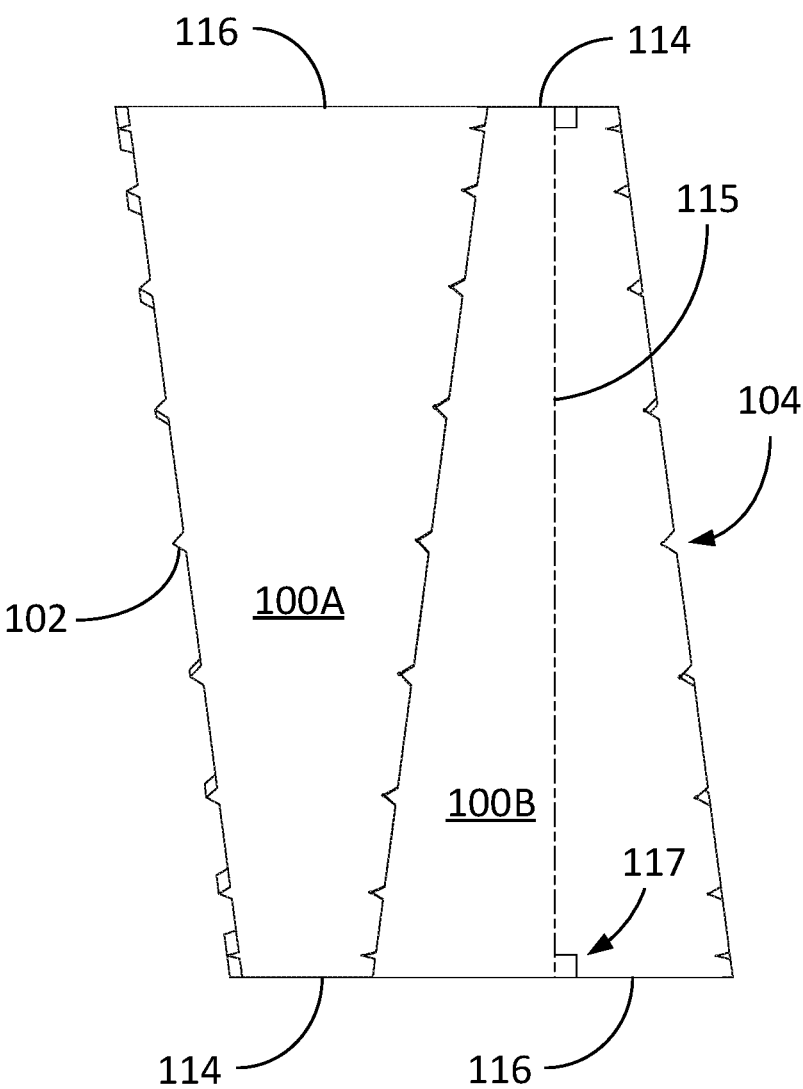
FIGS. 7A and 7B are line drawings of two pie cuts connected to form a straight tube section consistent with embodiments of the present invention.
Figure 7B:
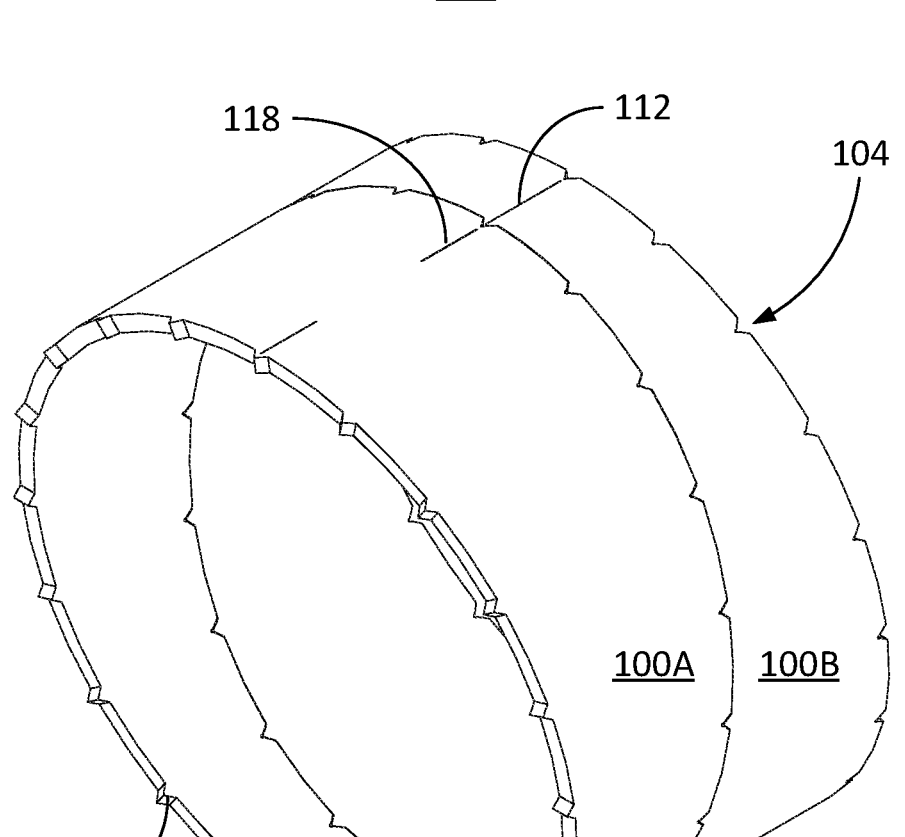

FIGS. 7A and 7B are line drawings of two pie cuts connected to form a straight tube section consistent with embodiments of the present invention. As shown in FIG. 7A, a first pie cut 100A is connected to a second pie cut 100B by way of interlocking keys 102 and facets 104 with the minimum distance 114 of the first pie cut 100A connected to the maximum distance 116 of the second pie cut 100B. In this arrangement, the two pie cuts 100A and 100B are joined together to form a larger linear/cylindrical tubular element 134. An orthogonal circumferential plane line 115 is shown in relation to the second pie cut 100B. The orthogonal circumferential plane line 115 is defined as a line section that is at right angles 117 to the outer edge/surface 124. It should be appreciated that the orthogonal circumferential plane line 115 is plane that would create essentially a circular cross-section of the pie cut 100. The front face 106 and the back face 108, though fairly circular, become increasingly elliptical as the angle of the face 106/108 increases relative to the orthogonal circumferential plane line 115. Hence, a pie cut cap 202 or 204 is more or less circular facilitating a longer pipe, such as with a sleeve or collar, to easily mate with the true circular pie cut cap face 206 or 208 (as opposed to the elliptical front or back face 106/108). FIG. 7B is an isometric drawing showing the first pie cut 100A connected to the second pie cut 100B via the interconnected keys 102 and facets 104 with the minimum wedge distance reference line 112 aligned with the maximum wedge distance reference line 118.

Figures 8A, 8B:
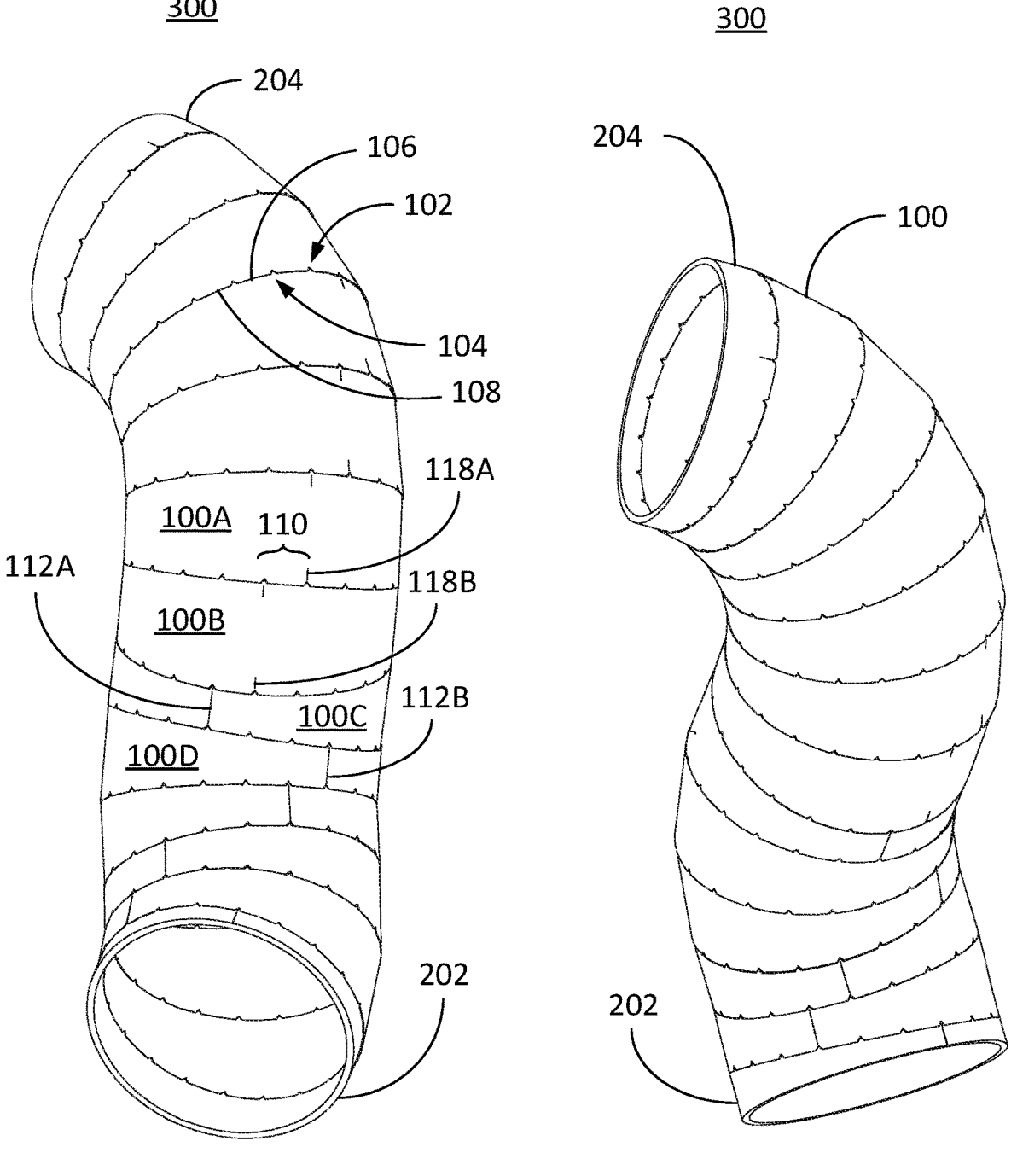
FIGS. 8A and 8B are line drawings that illustratively depict a custom shaped tube comprised of a plurality of pie cuts consistent with embodiments of the present invention.

FIGS. 8A and 8B are line drawings that illustratively depict a custom shaped tube comprised of a plurality of pie cuts consistent with embodiments of the present invention. FIG. 8A depicts a custom shaped tube arrangement 300 having eleven inner pie cuts 100 that are sandwiched between a first pie cut cap 202 and the second pie cut cap 204. Many of the pie cuts 100, 102 and 104 are rotated relative to one another with respect to their minimum and maximum wedge distance reference lines 112 and 118. For example, a first pie cut 100A is rotated to the right of the second pie cut 100B by one angular separation 110, which is the spacing between two adjacent keys 102 (or two adjacent facets 104). The single angular separation 110 of the first pie cut 100A and the second pie cut 100B is accounted for by way of the first maximum wedge distance reference line 118A displayed on the first pie cut 100A with respect to the second maximum wedge distance reference line 118B displayed on the second pie cut 100B. A third pie cut 100C is connected to the second pie cut 100B via a displacement of a first minimum wedge distance reference line 112A (of the third pie cut 100C) by one angular separation 110 from the second maximum wedge distance reference line 118B displayed on the second pie cut 100B. A fourth pie cut 100D is connected to the third pie cut 100C via a displacement of three angular separations 110 between the first minimum wedge distance reference line 112A and a second minimum wedge distance reference line 112B of the fourth pie cut 100D.

FIG. 8B illustratively depicts a different view of the custom shaped tube 300 of FIG. 8A. As shown here, the custom shaped tube 300 comprises a thirteen pie cuts 100, 202 and 204 that snake around in a particular desired shape. The custom shaped tube 300 easily reproducible by accounting for the displacement of each reference line 112 and 118 relative to an adjacent pie cut 100, 202 and 204. Certain methods envision positioning one pie cut 100 appropriately over another pie cut 100 by synching together the respective keys 102 and facets 104, as previously discussed, and tacking the pie cuts 100 together. Once the custom shaped tube 300 is tacked together, it is then welded along the adjoining faces 106 and 108 with a bead of metal. Of course, other means of joining the pie cuts 100 are envisioned and known to those skilled in the art, such as adhesive or some combination of adhesive for initially fixing pie cuts 100 together followed by welding the pie cuts 100 along their seams 106 and 108. The custom shaped tube 300 can have an associated record of all the displacements between the reference lines to easily reproduce more of the same custom shaped tubes 300.

FIGS. 9A-9C are line drawings illustratively depicting yet a different embodiment of the present invention with the angular separation between the facets and keys closer together than in the embodiments of FIG. 1. As shown in FIG. 9A, the arc shaped tube 400 comprises a plurality of center pie cuts 404 in which between the first pie cut cap 402 and the second pie cut 404. In this embodiment, because the keys 102 and facets 104 are closer together than the embodiment of FIG. 1, the custom resolution of the arc shaped tube 400 is higher than that of the embodiment related to FIG. 1. FIG. 9B illustratively depicts the first pie cut cap 402 with the plurality of closely spaced keys 102. FIG. 9C illustratively depicts a section of a keys 102 from the first pie cut cap 402 showing that the angular separation 110 smaller than that of FIG. 1. The outer surface 124 is shown for reference.

With the present description in mind, below are some examples of certain embodiments illustratively complementing some of the methods and apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments contemplate a tube arrangement 132, as shown in FIGS. 1-5D. In one embodiment, a tube arrangement 132 can comprise a first and a second wedge shaped circular tube (pie cut) 100A and 100B each defined by a front face 106 and a back face 108, a minimum face-to-face distance 114 between the front face 106 and the back face 108 that is smaller than a maximum face-to-face distance 116 between the front face 106 and the back face 108. A plurality of evenly spaced keys 102 are dispersed along the front face 106 of the first pie cut 100A. The keys 102 are engaged with a plurality of evenly spaced facets 104 dispersed along the back face 108 of the second pie cut 100B. A weld 128 seals a joint 125 located between the front face 106 of the first pie cut 100A to the back face 108 of the second pie cut 100B.

The tube arrangement 132 can further comprise a plurality of tacks 126 under the weld 128, wherein each of the tacks 126 are where one of the keys 102 is engaged with one of the facets 104. Other embodiments envision a tack 126 not being over the keys 102 but in another location along the interface 125 that is either generated using external tacking material (such as from a welding stick) or using material that is integrated with a pie cut 100 that extends from the first pie cut 100A and/or the second pie cut 100B at the interface 125. Certain embodiments envision that each of the facets 104 are triangular shaped and comprise a detolerance window 138 at an apex 140 of each of the facets 104. In some embodiments, the tacks 126 are envisioned to be melted material that bond the keys 102 to their corresponding facets 104, wherein a portion of the melted material is in the detolerance windows 138. In yet other embodiments, each of the tacks 126 is from a proud portion 136 of each of the keys 102, the proud portion 136 extends beyond an outer surface 124 of the first pie cut 100A.

The tube arrangement 132 is further envisioned wherein each of the keys 102 comprise a proud portion 136 that extends beyond an outer surface 124 of the second pie cut 100B.

The tube arrangement 132 can further comprise a first reference line 112A visibly located on a first outer surface 124 at the minimum face-to-face distance 114 of the first pie cut 100A and a second reference line 112B visibly located on a second outer surface 124 at the minimum face-to-face distance 114 of the second pie cut 100B.

The tube arrangement 132 wherein the tube arrangement 132 is further imaged to comprise a corresponding record of any displacement between the first reference line 112A and the second reference line 112B.

The tube arrangement 132 can further comprise a maximum wedge distance reference line 118 that is visibly located on an outer surface 124 of each of the first and the second pie cuts 100A and 100B at each of the maximum face-to-face distances 116.

The tube arrangement 132 can further comprise simply a reference line (not on the maximum face-to-face distances 116 or the minimum face-to-face distances 114) that is visibly located on an outer surface 124A or 124B of each of the first and the second pie cuts 100A or 100B extending from either a key 102 or a facet 104.

Another embodiment of the present invention envisions an interlocked tube 132 comprising a first pie cut tube section 100A that is defined by a substantially circular first front face 106A and a substantially circular first back face 108A. The first pie cut tube section 100A has a first minimum face-to-face distance 114A between the first front face 106A and the first back face 108A, wherein the first minimum face-to-face distance 114A is smaller than a first maximum face-to-face distance 116A between the first front face 106A and the first back face 108A. The first pie cut tube section 100A also has a plurality of evenly spaced keys 102 that is dispersed along the first front face 106A of the first pie cut tube section 100A. The interlocked tube 132 further comprising a second pie cut tube section 100B that is defined by a substantially circular second front face 106B and a substantially circular second back face 108B. The second pie cut tube section 100B having a second minimum face-to-face distance 114B that is between the second front face 106B and the second back face 108B. The second minimum face-to-face distance 114B is smaller than a second maximum face-to-face distance 116B between the second front face 106B and the second back face 108B. The second pie cut tube section 100B also having a plurality of evenly spaced facets 104 that is dispersed along the second back face 108B of the second pie cut tube section 100B. The interlocked tube 132 has a weld 128 that seals a joint 125 between the first front face 106A and the second back face 108B. There is at least one tack 126 under the weld 128, wherein the tack 126 connects one of the plurality of facets 104 to one of the plurality of keys 102.

The interlocked tube embodiment 132 is further envisioned wherein the each of the keys 102 are triangular shaped and the facets 104 conform to the keys 102. The facets 104 comprise a detolerance window 138 at an apex 140 of each of the facets 104.

In an embodiment of the interlocked tube 132 the tack 126 is melted material that bonds at least a portion of the key 102 to the facet 104. A portion of the melted material is in the detolerance windows 138. Optionally, each of the keys 102 can comprise a proud portion 136 that extends beyond an outer surface 124 of the first pie cut 100A before becoming the at least one tack 126, the melted material is from the proud portions 136.

The interlocked tube embodiment 132 can further comprise a first reference line 112A visibly located on a first outer surface 124 at the minimum face-to-face distance 114 of the first pie cut 100A and a second reference line 112B visibly located on a second outer surface 124 at the minimum face-to-face distance 114 of the second pie cut 100B.

The interlocked tube embodiment 132 further imagines that the tube arrangement 132 has a corresponding record of any displacement between the first reference line 112A and the second reference line 112B.

In yet another embodiment of the interlocked tube 132 a reference line 118 is visibly located on an outer surface 124 of each of the first and the second pie cuts 100A and 100B at each of the maximum face-to-face distances 116A and 116B.

The interlocked tube embodiment 132 also imagines a second plurality of the evenly spaced facets 104 being located at the first back face 108A and a second plurality of the evenly spaced keys 102 being dispersed along the second front face 106A.

Still another embodiment of the present invention envisions a method to connect a first pie cut tube section 100A to a second pie cut tube section 100B. The method can comprise a number of steps including orienting a first pie cut front face 106A of the first pie cut tube section 100A with a second pie cut back face 108B with the second pie cut tube section 100B. This can be followed by meshing together a plurality of keys 102 that are equally spaced on the first pie cut front face 106A with a plurality of facets 104 that are equally spaced on the second pie cut back face 108B. This step can then be followed by tacking at least one of the plurality of keys 102 to a corresponding one of the plurality of facets 104. Next, a contiguous seam 128 can be welded along the first pie cut front face 106A and the second pie cut back face 108B. The first pie cut tube section 100A is defined by a minimum face-to-face distance 114 between the first front face 106A and a first back face 108A of the first pie cut tube section 100A. The minimum face-to-face distance 114 is smaller than a maximum face-to-face distance 116 between the first front face 106A and the first back face 108A.

In another embodiment of the method, the tacking step can be accomplished via a spot weld 126, that is a weld tack that is just a point weld.

The method further imagines that the orienting step is accomplished via positioning a first reference line 112A that is visibly located on a first outer surface 124A at the minimum face-to-face distance 114 of the first pie cut tube section 100A relative to a second reference line 112B that is visibly located on a second outer surface 124B at a minimum face-to-face distance 114 of the second pie cut 100B.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, though the keys and facets are described herein as triangular shaped elements, other angular or rounded keys and facets can be employed without departing from the scope and spirit of the present invention. Likewise, the number of keys and facets can vary as long as they are consistent at the interface of each pie cut thereby maintaining substantially the same functionality without departing from the scope and spirit of the present invention. Finally, although the preferred embodiments described herein are directed to exhaust tubing, it will be appreciated by those skilled in the art that the teachings of the present invention can be applied to other systems that use variable angled tubing, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A tube arrangement comprising:

a first pie cut and a second pie cut, each pie cut being a wedge-shaped circular tube and each defined by a front face and a back face, a minimum face-to-face distance between the front face and the back face that is smaller than a maximum face-to-face distance between the front face and the back face;

a plurality of evenly spaced keys dispersed along the front face of the first pie cut, the keys engaged with a plurality of evenly spaced facets dispersed along the back face of the second pie cut; and a weld that seals a joint between the front face of the first pie cut to the back face of the second pie cut, wherein each of the facets comprises a substantially triangular shaped major portion and a detolerance window, the detolerance window having a different shape than the substantially shaped major portion and extending from an apex of the substantially triangular shaped major portion.

2. The tube arrangement of claim 1, further comprising a plurality of tacks under the weld.

3. The tube arrangement of claim 2, wherein the tacks are melted material that bond the keys to their corresponding facets, a portion of the melted material is in the detolerance windows.

4. The tube arrangement of claim 3, wherein each of the tacks is from a proud portion of each of the keys, the proud portion extends beyond an outer surface of the first pie cut.

5. The tube arrangement of claim 1, wherein each of the keys comprise a proud portion that extends beyond an outer surface of the second pie cut.

6. The tube arrangement of claim 1, further comprising a first reference line visibly located on a first outer surface at the minimum face-to-face distance of the first pie cut and a second reference line visibly located on a second outer surface at the minimum face-to-face distance of the second pie cut.

7. The tube arrangement of claim 6, wherein the tube arrangement comprises a corresponding record of any displacement between the first reference line and the second reference line.

8. The tube arrangement of claim 1, further comprising a reference line visibly located on an outer surface of each of the first and the second pie cuts extending from either one of the keys or one of the facets.

9. An interlocked tube comprising:

a first pie cut tube section defined by a substantially circular first front face and a substantially circular first back face, a first minimum face-to-face distance between the first front face and the first back face, the first minimum face-to-face distance is smaller than a first maximum face-to-face distance between the first front face and the first back face, and a plurality of evenly spaced keys dispersed along the first front face of the first pie cut tube section;

a second pie cut tube section defined by a substantially circular second front face and a substantially circular second back face, a second minimum face-to-face distance between the second front face and the second back face, the second minimum face-to-face distance is smaller than a second maximum face-to-face distance between the second front face and the second back face, and a plurality of evenly spaced facets dispersed along the second back face of the second pie cut tube section;

a weld that seals a joint between the first front face and the second back face; and at least one tack under the weld, the tack connecting one of the plurality of facets to one of the plurality of keys, and wherein each of the keys are substantially triangular shaped and each of the facets comprises a substantially triangular shaped major portion and a detolerance window, the detolerance window having a different shape than the substantially shaped major portion and extending from an apex of the substantially triangular shaped major portion.

10. The interlocked tube of claim 9, wherein the tack is melted material that bonds at least a portion of the key to the facet, a portion of the melted material is in the detolerance windows.

11. The interlocked tube of claim 10, wherein each of the keys comprise a proud portion that extends beyond an outer surface of the first pie cut tube segment before becoming the at least one tack, the melted material is from the proud portions.

12. The interlocked tube of claim 9, further comprising a first reference line visibly located on a first outer surface at the minimum face-to-face distance of the first pie cut tube segment and a second reference line visibly located on a second outer surface at the minimum face-to-face distance of the second pie cut tube segment.

13. The interlocked tube of claim 12, wherein the tube arrangement comprises a corresponding record of any displacement between the first reference line and the second reference line.

14. The interlocked tube of claim 9, further comprising a reference line visibly located on an outer surface of each of the first and the second pie cut tube segments and at each of the maximum face-to-face distances.

15. The interlocked tube of claim 9, wherein a second plurality of evenly spaced facets are located at the first back face and a second plurality of evenly spaced keys are dispersed along the second front face.

16. A method to connect a first pie cut tube section to a second pie cut tube section, the method comprising:

orienting a first pie cut front face of the first pie cut tube section with a second pie cut back face of the second pie cut tube section;

next, meshing together a plurality of keys equally spaced on the first pie cut front face with a plurality of facets equally spaced on the second pie cut back face;

next, tacking at least one of the plurality of keys to a corresponding one of the plurality of facets;

next, welding a contiguous seam along the first pie cut front face and the second pie cut back face, the first pie cut tube section defined by a minimum face-to-face distance between the first pie cut front face and a first back face of the first pie cut tube section, the minimum face-to-face distance is smaller than a maximum face-to-face distance between the first pie cut front face and the first pie cut back face, and wherein each of the keys are substantially triangular shaped and each of the facets comprises a substantially triangular shaped major portion and a detolerance window, the detolerance window having a different shape than the substantially shaped major portion and extending from an apex of the substantially triangular shaped major portion.

17. The method of claim 16, wherein the tacking step is accomplished via a weld tack.

18. The method of claim 16, wherein the orienting step is accomplished via positioning a first reference line that is visibly located on a first outer surface at the minimum face-to-face distance of the first pie cut tube section relative to a second reference line that is visibly located on a second outer surface at a minimum face-to-face distance of the second pie cut tube section.

\* \* \* \* \*